(12) United States Patent
Heinzen

(10) Patent No.: US 6,595,523 B1
(45) Date of Patent: Jul. 22, 2003

(54) SELF MONITORING MECHANICAL SEAL

(76) Inventor: Ralph Heinzen, Box 728, Garrison, ND (US) 58540

( * ) Notice: Subject to any disclaimer, the term of this patent is extended or adjusted under 35 U.S.C. 154(b) by 0 days.

(21) Appl. No.: 09/089,580

(22) Filed: Jun. 3, 1998

(51) Int. Cl.[7] ................................................ F16J 15/00
(52) U.S. Cl. ...................................................... 277/321
(58) Field of Search ................................ 277/321, 929

(56) References Cited

U.S. PATENT DOCUMENTS 5,540,448 A * 7/1996 Heinzen ..................... 277/321
6,003,872 A * 12/1999 Nord ..................... 277/321 X

* cited by examiner

*Primary Examiner*—Robert J. Sandy
*Assistant Examiner*—Karlena D Schwing

(57) ABSTRACT

Wear on the sealing surface of mechanical seals may be monitored by placing a sensor or conductor on the seal, at a position opposed to the sealing surface, such as on the back or opposite side of the sealing surface. Mechanical seals require the application of continuous external pressure to maintain fluid tight sealing integrity. Wear on the sealing surface may be monitored by measuring the amount of movement of the seal away from a predetermined starting point.

12 Claims, 5 Drawing Sheets

SELF MONITORING MECHANICAL SEAL

FIELD OF THE INVENTION

This invention relates to seals which are positioned between two members to maintain a fluid tight sealing relationship between the two members and the seal. More particularly, this invention relates to mechanical seals of the type in which the seal maintains a fluid tight sealing relationship in conjunction with continuous external pressure applied to the seal.

BACKGROUND OF THE INVENTION

Machinery often includes members which move with respect to each other. Bearings have long been used to facilitate such movement. Bearings may be used to aid in transmitting forces from one member to another and to reduce friction. Rolling elements may often be used in bearings to reduce friction, such as in ball bearings. Bearings may often contain lubricant to reduce the friction created within the bearing.

Leakage of fluid from between mechanical parts has long been a problem. Contamination of the bearings or seals with foreign material such as dirt has also long been a problem. Both loss of fluid and contamination may lead to increased friction and wear within the structure, damaging the structure and perhaps damaging the machinery.

Seals composed of a soft polymeric material may be used with bearings to prevent lubricant leakage and contamination. The polymeric material contacts a moving surface in the bearing and provides a seal. Friction between the polymeric material and the moving surface gradually wears the surface of the polymeric material away. If the polymeric material becomes too worn, it may no longer form a fluid tight seal against the moving surface, and fluid leakage from the bearing and contamination of the bearing may again become problems.

In other instances, metal or polymeric seals may be placed between moving parts. This arrangement may be particularly useful when the movement is a reciprocal, rotating or oscillating movement. Non-limiting illustrations of such seals include a piston and cylinder structure, hatches, air locks, doors, covers, lids and caps. With regard to such seals as found in hatches, air locks, doors, covers, lids and caps, the interfitting members may be said to reciprocate with respect to each other, in the sense of opening and closing with regard to each other. However, when a seal is in fluid tight sealing relationship between such interfitting members, the seal may more properly be termed a static or stationary seal, since the interfitting members and the interposed seal are all stationary with regard to each other while the integrity of the sealing relationship is maintained. In certain types of members which are reciprocating with respect to each other, the seal may be made so that it always makes contact with the piston connecting rod and the connecting rod is electrically insulated from the piston barrel. Sealing integrity or effectiveness may also be compromised by cracking, breaking, loss of flexibility or deterioration due to such conditions as repeated flexing, bending and/or compression, or length of contact with various fluids or container contents.

Various methods have been developed to prevent or detect leakage past a seal. As shown in U.S. Pat. No. 4,761,023, one method involves monitoring the pressure of the fluid on the high pressure side of the seal, with a loss of pressure indicating leakage past the seal. Alternatively, as shown in U.S. Pat. No. 4,290,611, the fluid pressure on the low pressure side of the seal may be monitored, with an increase in pressure indicating fluid leakage. A third method, such as that shown in U.S. Pat. No. 4,178,133, uses colored fluid and visual monitoring of leakage past a seal. Still other methods involve manual maintenance procedures, wherein seals are inspected or replaced on a regular basis.

These various methods to prevent or detect leakage past a seal have not proven satisfactory due to a number of problems. A problem with monitoring fluid pressure is that it is only effective to detect leakage of the fluid. Often this is too late to prevent damage. It is desired that the seal be replaced before leakage has begun. Similarly, visual monitoring of fluid leakage can only indicate that leakage has begun, not that leakage is about to begin. A problem with manual inspection of a seal is that it requires an inspector who is not only trained but also diligent. Often seals are not inspected merely due to neglect or lack of diligence. Another problem with manual inspection is that it may require the machinery to be stopped during the inspection, which can be inconvenient. Scheduled seal replacement also has problems. Seals may wear more or less quickly depending on operating conditions, and scheduled seal replacement may occur too early (before the seal needs to be replaced) or too late (after the seal starts leaking).

An excellent solution to these problems has been provided by the inventions disclosed in my U. S. Pat. No. 5,540,448, issued Jul. 30, 1996, entitled SEAL WITH ELECTRICAL CONDUCTOR WEAR INDICATOR and in my U.S. Pat. No. 5,246,235, issued Sep. 21, 1993, entitled SEAL WITH EMBEDDED WIRE. However, it has recently been determined that some seals may not be able to be monitored by installing a circuit on the sealing surface or embedding the circuit in the seal, in the manner described in my two previous patents. This may be because the design and/or the function of the particular seal or the sealing environment in which the seal is located will not permit any extraneous material at or on the sealing surface of the seal without compromising the fluid tight sealing integrity of the seal. In certain applications, the tolerances of the sealing surfaces may be measured in wave lengths of light. In other applications, the composition of the material of the seal body may not be compromised, without also compromising sealing integrity. Examples of seal environments in which sensors may not be placed on the sealing surface are found in apparatus such as mixers, doubled-ended pumps, vertical pumps, reactors, clarifiers, agitators, vacuum pumps and other similar equipment subject to moderate shaft runout and end play.

Generally speaking, such seals require the application of continuous external pressure to maintain fluid tight sealing integrity. External pressure may be applied by the use of springs, air pressure, packing nuts, hydraulic pressure, or any other similar external force. Such seals may be found in conjunction with parts which are moving, reciprocating and/or stationary with respect to each other. For convenience, a seal of this type will be referred to herein as a "mechanical seal."

The present invention is particularly adapted to work with mechanical seals, which require the application of continuous external pressure to maintain fluid tight sealing integrity. According to the present invention, the wear on the sealing surface of these mechanical seals may be monitored by placing a sensor or conductor on the seal, at a position opposed to the sealing surface, such as on the back or opposite side of the sealing surface. The wear on the sealing surface may then be monitored by measuring the amount of movement of the seal away from a predetermined starting point.

SUMMARY OF THE INVENTION

The present invention provides a mechanical seal for recognizing excessive seal wear and the need for seal replacement before fluid leakage past the seal occurs. The seal is placed between members or surfaces which may be moving (e.g., rotating, reciprocating, etc.) or static with respect to each other and forms a seal with the moving member or between the static members to prevent fluid leakage. The seal is in engaged contact with and between the surfaces to prevent passage of fluid between either of the members and the seal. The seal is more readily deteriorated than at least one of the members. The seal is designed and adapted to maintain a fluid tight sealing relationship with the members in conjunction with externally applied pressure, so long as the seal has not deteriorated beyond a specified degree. An electrical conductor for determining seal wear is comprised of two mating parts. A first mating part is associated with the seal at a position opposed to the sealing surface. As the sealing surface of the seal wears, the seal will move away from the point of electrical contact between the two mating parts, thus moving the mating parts away from each other. Movement of the mating parts away from each other results in electrical discontinuity of the conductor. Thus, electrical discontinuity indicates deterioration of the sealing surface to the degree that the seal requires replacement. The electrical conductor may be, for example, a fuse or a pressure switch.

In another embodiment, an optical conductor for determining seal wear is comprised of two mating parts. A first mating part is associated with the seal at a position opposed to the sealing surface. As the sealing surface of the seal wears, the seal will move away from the point of optically conductive contact between two mating parts, thus moving the mating parts away from each other. Movement of the mating parts away from each other results in optical discontinuity of the conductor. Thus, optical discontinuity indicates deterioration of the sealing surface to the degree that the seal requires replacement.

According to another embodiment, a sonic sensor for determining seal wear is comprised of two mating parts. A first mating part is associated with the seal at a position opposed to the sealing surface. As the sealing surface of the seal wears, the seal will move away from the point of contact of the sonic sensor, thus moving the mating parts away from each other. Movement of the mating parts away from each other results in discontinuity of the sonic sensor and causes emission of a sonic signal. Thus, emission of a sonic signal indicates deterioration of the sealing means to the degree that the seal requires replacement.

The present invention provides a simple, cost effective device and method to detect deterioration of a mechanical seal disposed between moving or reciprocating surfaces, avoiding the problems of previous devices. Because the device detects deterioration of the seal body rather than fluid leakage, the seal may be replaced prior to leakage. The problems associated with waiting until after leakage has begun before replacing the seal may be avoided. The seal may be replaced in a timely manner before leakage begins. Because the present invention is based on optical, sonic or electrical continuity, an optical, sonic or electrical signal circuit may easily be incorporated with the invention. The signal circuit may indicate to an operator when a seal needs to be replaced, and there is no problem with diligence on the part of an inspector. Because wear of the seal body may be determined without manual inspection, problems with training inspectors and with missed or failed inspections are avoided. There is also no need to stop the equipment or machinery just to check if the seal needs to be replaced. Because the present invention monitors the actual amount of deterioration on the seal body, there is no problem with early or late replacement of the seal based on a scheduled replacement program. Replacement of the seal of the present invention may be based on the actual life of the seal body in operation, not on an average seal body life. Seals may be replaced less often and cost is reduced.

DETAILED DESCRIPTION OF THE INVENTION

Figure 1:
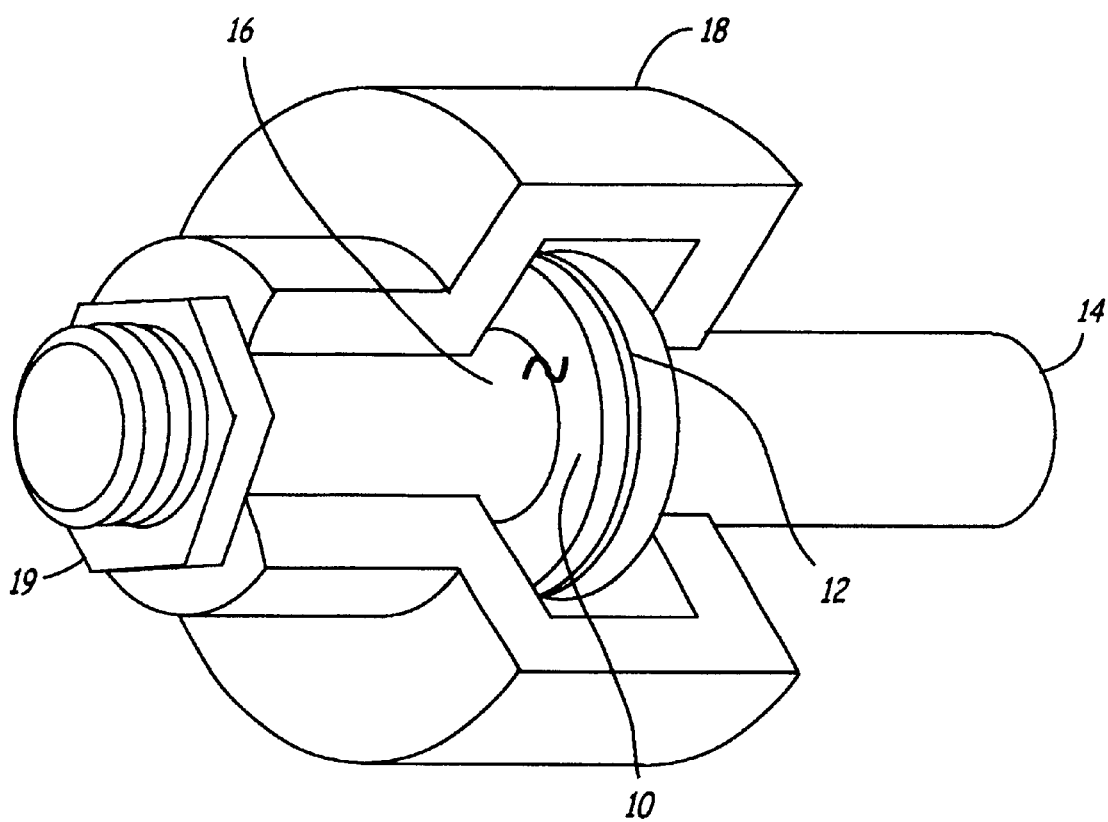
FIG. 1 shows a cut-away view of a mechanical seal in position within a housing.

FIG. 1 illustrates a typical mechanical seal 10 in place against a shaft collar 12 and around a shaft 14. The shaft 14 may rotate or oscillate. The mechanical seal 10 may be maintained in position against the shaft collar 12 by means of spring 16. The mechanical seal body 10, shaft collar 12 and shaft 14 may be contained within housing 18, and may retain a fluid tight seal with shaft collar 12, shaft 14 and housing 18. Nut 20 may secure shaft 14 within housing 18, while providing additional external pressure to maintain the fluid tight seal of the mechanical seal body 10 with shaft collar 12, shaft 14 and housing 18.

Figure 2:
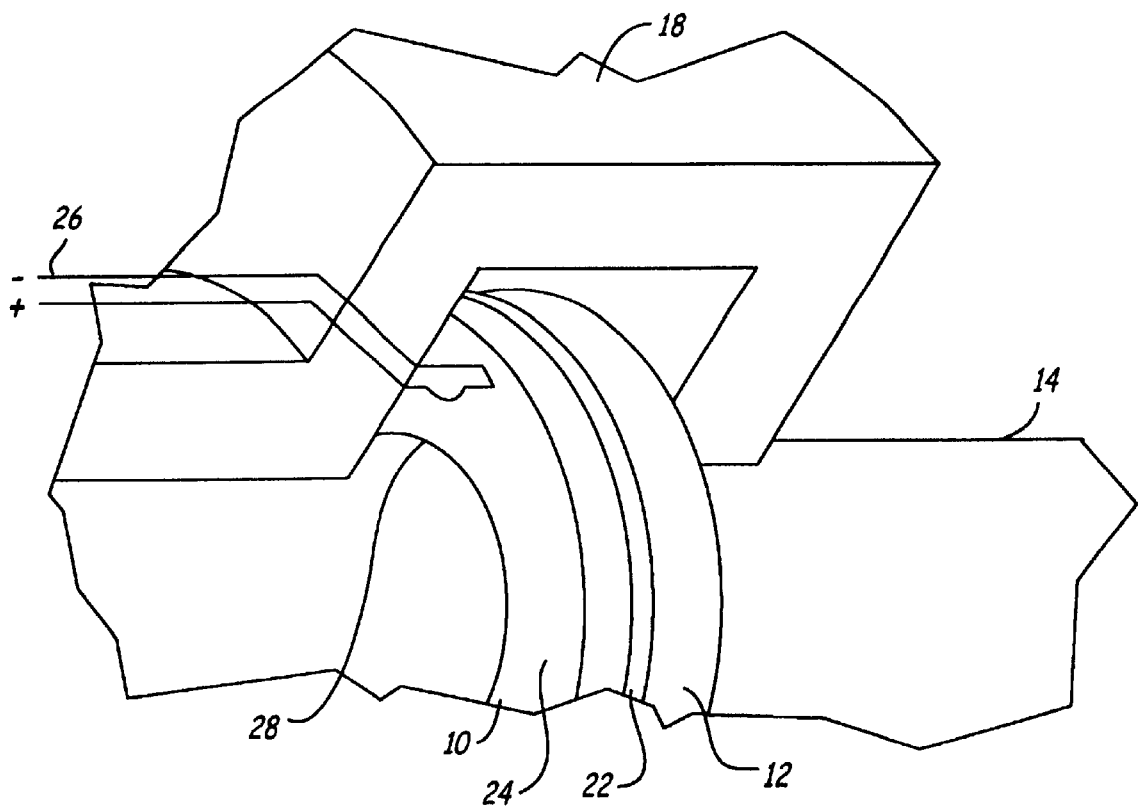
FIG. 2 is an enlargement of the mechanical seal of FIG. 1 with an electrical conductor, illustrated as a fuse, for determining seal wear.

According to the present invention, a mechanical seal, of the type illustrated with reference to FIG. 1, is provided with a sensor for indicating when the sealing surface has deteriorated to the extent that the seal requires replacement but prior to the extent that the seal begins to leak or allow passage of fluid. FIG. 2 is an enlargement of the mechanical seal 10, seen in FIG. 1, with like numbers indicating like parts throughout. The seal body 10 is in engaged contact with the shaft collar 12 and the shaft 14, to prevent passage of fluid between either of these members and the seal body 10. The seal body 10 may be composed of a polymeric material or other suitable substance and should be a dielectric or an electrical insulator. The material of the seal body 10 is more easily deteriorated than that of the shaft collar 12 or the shaft 14, so that friction preferentially wears the sealing surface 22 of the seal 10 rather than the shaft collar 12 or the shaft 14. The sealing surface 22 of the seal body 10 may gradually wear away due to friction between the outer surface of the shaft 14 and the confronting surface of the shaft collar 12. As discussed above with reference to FIG. 1, the seal body 10 maintains a fluid tight sealing relationship with the shaft collar 12 and the shaft 14 in conjunction with externally applied pressure of the nut (not visible in FIG. 2), as long as the sealing surface 22 of the seal body 10 has not deteriorated beyond a specified degree. The surface of the seal body 10 opposite the sealing surface 22 may be treated to render it electrically conductive. This may be done by applying or coating an electrically conductive layer 24. A pair of electrically conductive leads 26 extend outside of the housing 18 and form an electrically conductive circuit with the electrically conductive layer 24 on the seal body 10 by means of a fuse 28. As the sealing surface 22 of the seal body 10 begins to wear from contact with the shaft collar 12, the seal body 10 will begin to move gradually toward the shaft collar 12, straining and finally disengaging the contact of the fuse 28 and breaking the electrical circuit. The leads 26 may be connected, external to the housing 18, to an exterior signal-type electrical circuit, not shown. The electrical circuit may signal to an operator that the seal body 10 requires replacement based on the absence of electrical continuity through the circuit. A suitable electrical signal device is described in my U. S. Pat. Nos. 5,246,235 and 5,540,235, both of which are specifically incorporated herein by reference.

Figure 3:
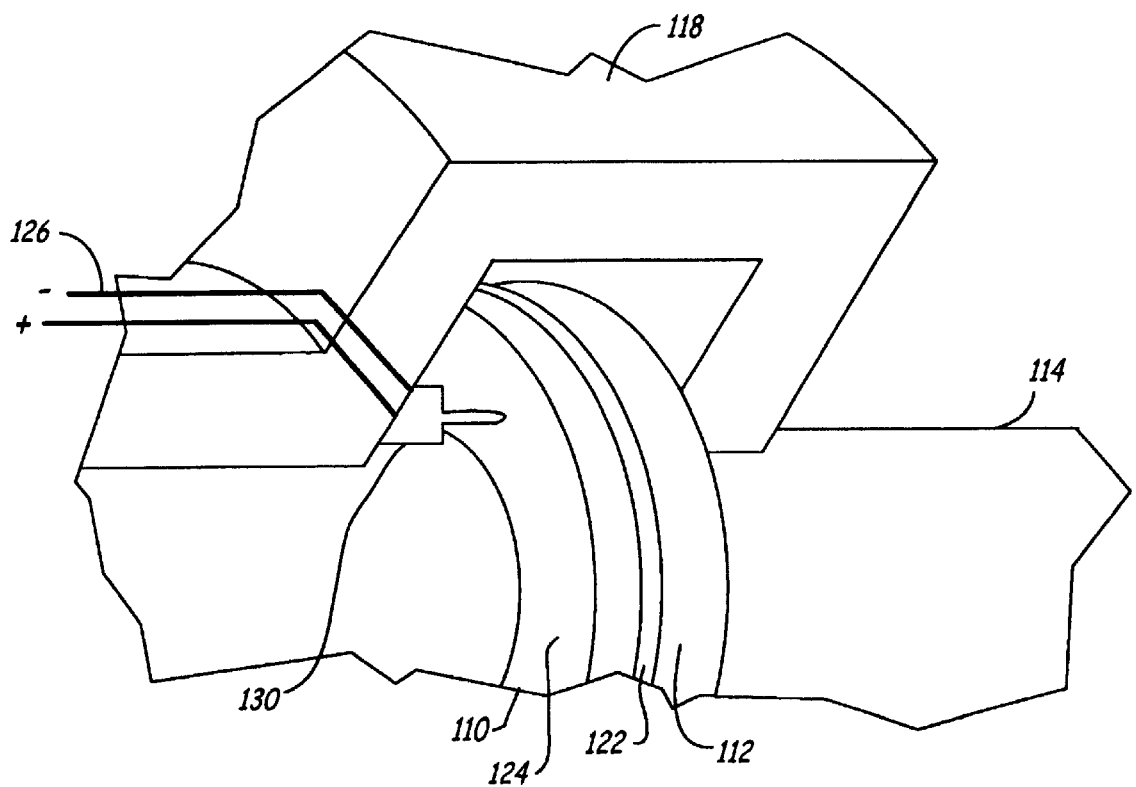
FIG. 3 is an enlargement of the mechanical seal of FIG. 1, with a pressure switch as the electrical conductor for determining seal wear.

In the embodiment shown in FIG. 3, the mechanical seal body 110 is likewise in engaged contact with the shaft collar 112 and the shaft 114 within housing 118, as described above with reference to FIGS. 1 and 2. Here again, the surface of the seal body 110 opposite the sealing surface 122 may be treated to render it electrically conductive. This may be done by applying or coating an electrically conductive layer 124. A pair of electrically conductive leads 126, as described with reference to FIG. 2, extend outside of the housing 118. The conductive leads 126 form an electrically conductive circuit with the electrically conductive layer 124 on the seal body 110 by means of a pressure switch 130. As the sealing surface 122 of the seal body 110 begins to wear from contact with the shaft collar 112, the seal body 110 will begin to move gradually toward the shaft collar 112, finally disengaging contact with the pressure switch 130 and breaking the electrical circuit. The leads 126 may be connected, external to the housing 118, to an exterior signal-type electrical circuit of the type described above with reference to FIG. 2.

Figure 4:
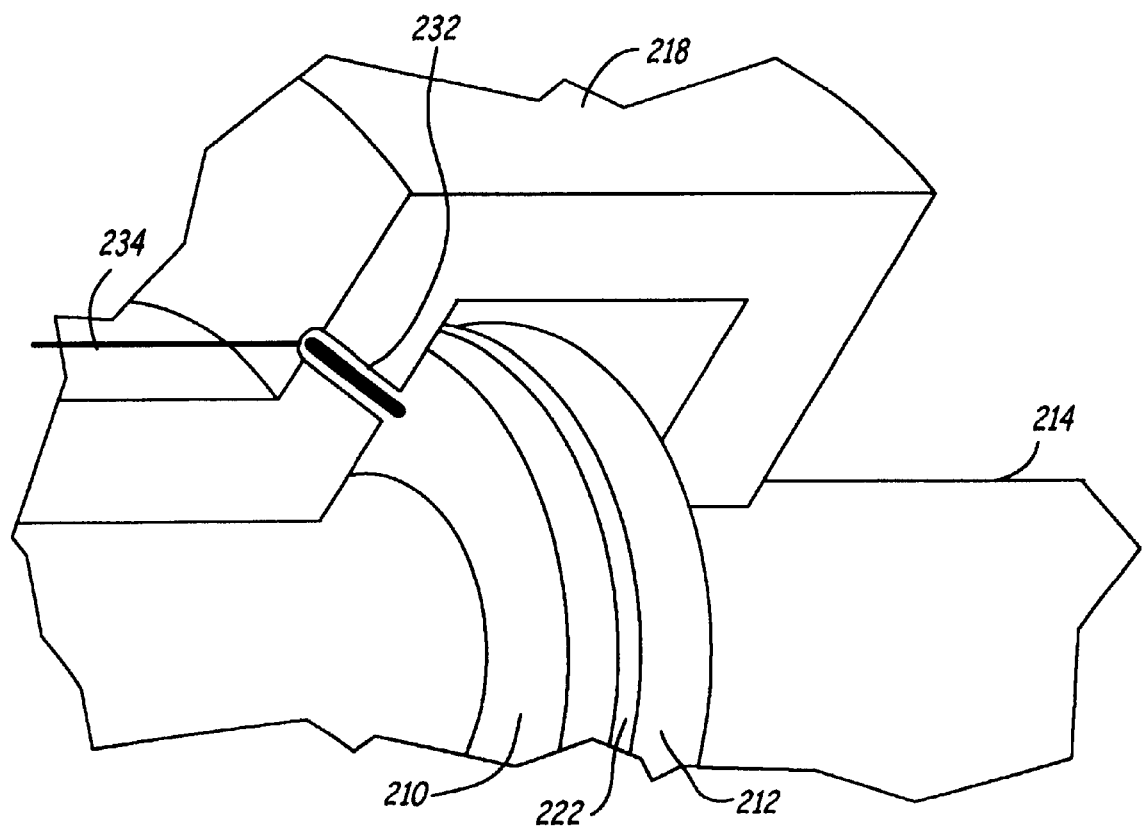
FIG. 4 is an enlargement of the mechanical seal of FIG. 1, with an optical sensor and optical fiber for determining seal wear.

Another embodiment of the present invention is shown with reference to FIG. 4. The mechanical seal body 210 is in engaged contact with the shaft collar 212 and the shaft 214 within housing 218, as described above with reference to FIG. 1. An optical sensor 232 is positioned in contact with the surface of the mechanical seal body 210 which is opposite to the sealing surface 222. The optical sensor 232 is in optically continuous contact with an optical fiber 234 which extends outside of the housing 218. As the sealing surface 222 of the seal body 210 begins to wear from contact with the shaft collar 212, the seal 210 will begin to move gradually toward the shaft collar 212, finally disengaging contact of the optical sensor 232 with the optical fiber 234 and severing the optically continuous contact. The optical fiber 234 may be connected, external to the housing 218. Suitable optical fibers and corresponding sensing mechanism may be obtained from Banner Engineering Corporation of 9714 10th Avenue North, Mpls. Minn. 55441. The Handbook of Photoelectric Sensing, particularly at pages A-8 to A-11, describes such photoelectric sensing for use in other environments. A suitable device identified as Model LP510CU is disclosed. Information from the photosensing device to circuitry that evaluates the information and warns of excessive wear of the seal.

Figure 5:
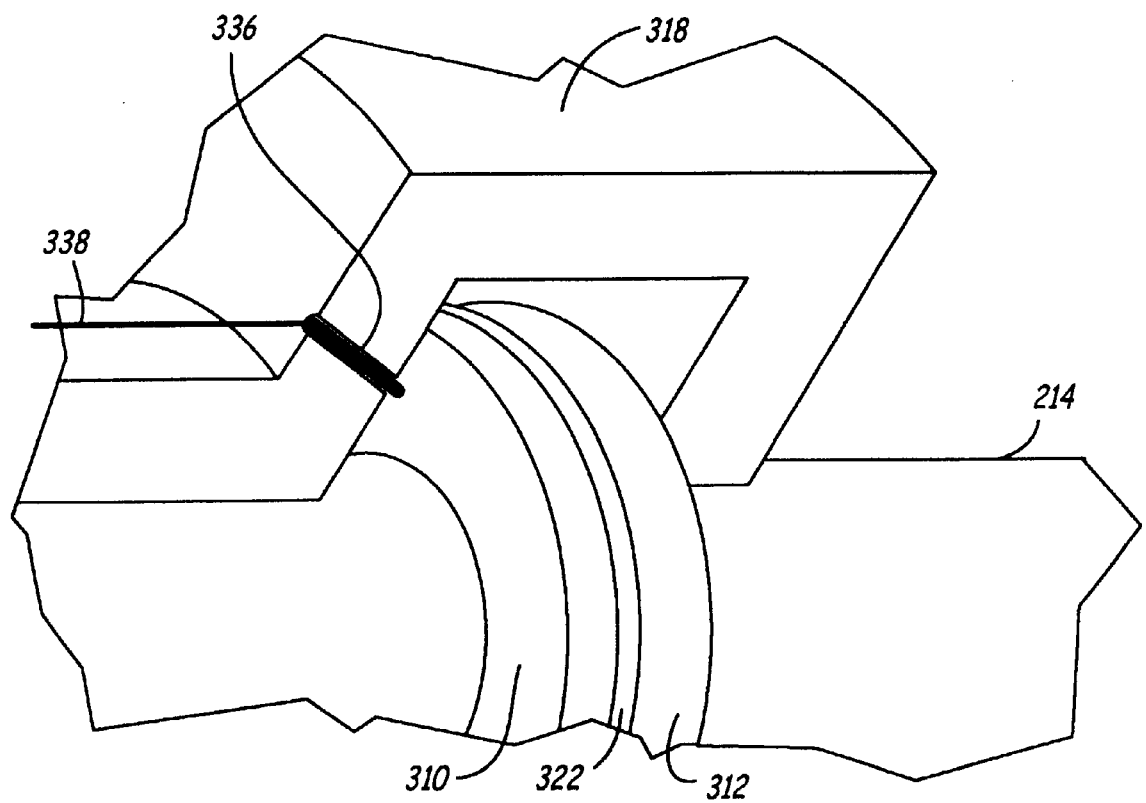
FIG. 5 is an enlargement of the mechanical seal of FIG. 1, with a sonic sensor for determining seal wear.

A fourth embodiment of the present invention is shown with reference to FIG. 5. The mechanical seal body 310 is in engaged contact with the shaft collar 312 and the shaft 314 within housing 318, as described above with reference to FIG. 1. A sonic sensor 336 is positioned in contact with the surface of the mechanical seal 310 which is opposite to the sealing surface 322. The sonic sensor 336 is in optically continuous contact with a lead 338 which extends outside of the housing 318. As the sealing surface 322 of the seal body 310 begins to wear from contact with the shaft collar 312, the seal body 310 will begin to move gradually toward the shaft collar 312, finally disengaging contact of the sonic sensor 336 with the lead 338 and severing the optically continuous contact. The lead 338 may be connected, external to the housing 318, to suitable circuitry that evaluates the sensed information warning of excessive wear of the seal. Suitable equipment is described in the Handbook of Photoelectric Sensing at pages A-11, A-12, B-22 and B-23. A suitable sensor is the Banner Omini-Beam model. The optical sensor includes an emitter and a receiver for sensing. The sensor recognizes when the surface of the seal has changed since the beam returned to the receiver either due to intensity change or by the angle of reflection change. The sonic transducer can detect a change in the amount of time of reflection or the strength of the returning signal.

Although the present invention has been described with reference to preferred embodiments, workers skilled in the art will recognize that changes may be make in form and detail without departing from the spirit and scope of the invention.

That which is claimed is:

1. A seal structure comprising:
   sealing means for engaged contact with a plurality of members, so as to prevent passage of fluid between at least one of the members and the sealing means, said sealing means more readily deteriorated than one of the members, the sealing means designed and adapted to maintain a fluid tight sealing relationship with the members in conjunction with externally applied pressure, so long as the sealing means has not deteriorated beyond a specified degree; and
   an electrical conductor comprised of at least two mating parts, a first mating part associated with the sealing means at a position opposed to a sealing surface, such that movement of the mating parts relative to each other causes electrical change of the conductor and indicates deterioration of the sealing surface to the degree that the seal requires replacement.

2. A seal according to claim 1, wherein a sealing surface of the sealing means is in engaged contact with one of the members and the first mating part of the conductor is at a position other than the sealing surface.

3. A seal according to claim 1, wherein the electrical conductor is a fuse.

4. A seal according to claim 1, wherein the electrical conductor is a pressure switch.

5. A seal according to claim 1, wherein a first mating part is an electrically conductive material on the sealing means, a second mating part is electrically conductive wire spaced apart from the sealing relationship and electrical change is caused by movement of the first mating part away from the second mating part.

6. A seal according to claim 1, wherein a surface of the sealing means, opposite the sealing surface, is provided with an electrically conductive layer.

7. A seal for preventing passage of a fluid between two members, said seal comprising:
   sealing means for engaged contact with both members, so as to prevent passage of fluid between either of the members and the sealing means, said sealing means more readily deteriorated than one of the members, the sealing means designed and adapted to maintain a fluid tight sealing relationship with the members in conjunction with externally applied pressure, as long as the sealing means has not deteriorated beyond a specified degree; and an optical conductor comprised of two mating parts, a first mating part associated with the sealing means at a position opposed to a sealing surface, such that movement of the mating parts away from each other causes loss of optical conductivity, which indicates deterioration of the sealing surface to the degree that the seal requires replacement.

8. A seal according to claim 7, wherein the optical conductor is an optical fiber.

9. A seal for preventing passage of a fluid between two members, said seal comprising:

sealing means for engaged contact with both members, so as to prevent passage of fluid between either of the members and the sealing means, said sealing means more readily deteriorated than one of the members, the sealing means designed and adapted to maintain a fluid tight sealing relationship with the members in conjunction with externally applied pressure, as long as the sealing means has not deteriorated beyond a specified degree; and a sonic sensor comprised of two mating parts, a first mating part associated with the sealing means at a position opposed to a sealing surface, such that movement of the mating parts away from each other indicates deterioration of the sealing means to the degree that the seal requires replacement, and causes emission of a sonic signal.

10. A method of determining wear of a seal, said method comprising the steps of:

positioning a first mating part of an electrical conductor in association with a sealing means at a position opposed to a sealing surface;

connecting an electrical circuit through the conductor;

determining electrical continuity through the conductor;

wherein electrical change through the conductor caused by movement of the two mating parts relative to each other indicates deterioration of the sealing surface to the degree that the seal requires replacement.

11. A method of determining wear of a seal, said method comprising the steps of:

positioning a first mating part of an optical conductor in association with a seal at a position opposed to a sealing surface;

positioning a first mating part and a second mating part of the optical conductor in optically conductive relationship to each other; determining an optically conductive relationship through the conductor;

wherein optical change through the conductor caused by movement of the two mating parts relative to each other indicates deterioration of the sealing surface to the degree that the seal requires replacement.

12. A method of determining wear of a seal, said method comprising the steps of:

positioning a first mating part of a sonic sensor in association with a sealing means at a position opposed to a sealing surface;

positioning a first mating part and a second mating part of the sonic sensor in sonically conductive relationship to each other;

determining a sonically conductive relationship through the conductor;

wherein sonic change through the conductor caused by movement of the two mating parts away from each other indicates deterioration of the sealing surface to the degree that the seal requires replacement.

* * * * *